(12) United States Patent
Martin et al.

(10) Patent No.: US 7,127,266 B2
(45) Date of Patent: Oct. 24, 2006

(54) SYSTEM AND METHOD FOR EFFICIENT MEDIA RESOURCE ALLOCATION

(75) Inventors: David Martin, Chantilly, VA (US); Trinh Vu, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 0 days.

(21) Appl. No.: 11/227,401

(22) Filed: Sep. 15, 2005

(65) Prior Publication Data

US 2006/0063550 A1  Mar. 23, 2006

Related U.S. Application Data

(60) Provisional application No. 60/610,529, filed on Sep. 17, 2004.

(51) Int. Cl.
*H04B 7/00* (2006.01)
*H04Q 7/20* (2006.01)

(52) U.S. Cl. .................. 455/519; 455/520; 455/450; 455/464

(58) Field of Classification Search ............... 455/518, 455/519, 515, 509, 458, 521, 416, 452.1, 455/453, 420, 517, 520, 463, 464, 450
See application file for complete search history.

(56) References Cited

U.S. PATENT DOCUMENTS

| | | | |
|---|---|---|---|
| 5,513,381 A * | 4/1996 | Sasuta | 455/509 |
| 5,924,041 A * | 7/1999 | Alperovich et al. | 455/456.1 |
| 6,484,037 B1 * | 11/2002 | Schmidt et al. | 455/514 |
| 6,873,854 B1 * | 3/2005 | Crockett et al. | 455/518 |

* cited by examiner

*Primary Examiner*—Edward F. Urban
*Assistant Examiner*—John J. Lee

(57) ABSTRACT

A system and method for allocating service provider network resources for supporting dispatch multi-party calls is disclosed. In an embodiment of a method of the present invention, the method includes receiving a requirement at the service provider network for supporting a dispatch multi-party call having a projected number of participants. An amount of network resources required to support the projected number of participants is determined. A portion of the amount of network resources required to support the projected number of participants in the dispatch multi-party call is dedicated to the dispatch multi-party call in the service provider network. In an embodiment of a system of the present invention, the system includes a media server having resources for supporting a dispatch multi-party call having a projected number of participants in a service provider network. A resource manager is coupled to the media server and determines an amount of media server resources required to support the projected number of participants and dedicates a portion of the amount of media resources required to support the projected number of participants in the media server.

37 Claims, 2 Drawing Sheets

SYSTEM AND METHOD FOR EFFICIENT MEDIA RESOURCE ALLOCATION

This application claims the benefit of U.S. Provisional Patent Application Ser. No. 60/610,529, filed Sep. 17, 2004, the disclosure of which is herein expressly incorporated by reference.

FIELD OF THE INVENTION

The present invention relates generally to the field of telecommunications, and in particular to the allocation of resources in a dispatch service provider network.

BACKGROUND OF THE INVENTION

Cellular communications systems typically provide interconnect and/or dispatch voice communication services. Interconnect voice communication services are those typically provided by most cellular carriers as circuit-switched communications. Dispatch communication services are commonly known as a "walkie-talkie" type of call, such as provided by Nextel Communications, Inc. and identified by the trade names Push-To-Talk (PTT) or Direct Connect. The popularity of dispatch calls is ever expanding and this increase in popularity has created a demand for these types of calls.

Currently, dispatch communication services can typically provide private and multi-party calls. A private dispatch call is between two parties, while a multi-party dispatch call, which can be either a group call or a chatroom call, as will be further explained later in this specification, is between more than two parties, each of whom can converse with each of the other participants during the call. Multi-party calls are becoming increasingly popular because they allow a subscriber to converse with numerous other subscribers in the same session. This provides particular utility in both business applications and for social communications. However, there are aspects in the way dispatch multi-party calls are handled by the dispatch service provider network that does not provide for efficient utilization of resources within the network.

Currently, due to various limitations, most multi-party dispatch calls are only able to be conducted between a few participants, e.g., four or five people. One of these limitations, for example, is the narrowband RF interface into the service provider network for the potential participants. Because bandwidth is limited, it has been possible for only a relatively limited number of participants to participate in multi-party dispatch calls. Due to the limited participation in these currently conducted multi-party sessions, the issue of efficiently utilizing network resources to support these multi-party calls has not been a significant concern for service provider networks. However, multi-party dispatch calls do present unique issues for a dispatch network service provider in efficiently utilizing network resources. These issues will only become more challenging for service providers as the number of potential participants in these calls ever increases.

Currently, as discussed above, dispatch multi-party calls are generally conducted between a small number of participants. In assigning network resources to support these calls, currently, the service provider dedicates enough resources to support the projected number of participants in the call. Therefore, if the network has a requirement to support a multi-party dispatch call with four participants, the network dedicates sufficient resources to support a call between all four projected participants in the call. However, in the large majority of multi-party calls that are conducted, the number of actual participants in the call is less than the projected number of participants. Therefore, in this situation where the actual participation is less than the projected participation, because network resources are dedicated to support the call at the projected level of participation, an inefficient use of network resources results. Currently, even if the actual participation is less than the projected participation, network resources are dedicated based on the projected participation in order to ensure adequate resources are available; even if this results in inefficiencies for the network.

However, today, even if network inefficiency is inherent in dedicating service provider media resources to support multi-party calls, the impact of this inefficiency may not be significant. For example, since multi-party calls are generally only conducted between a small number of participants, e.g., four people, if the network dedicates resources for all four projected participants and only three actually participate, this inefficient use of resources is most-likely not too detrimental to the network. Whereas only 75% of the dedicated resources were actually required, the inefficiency for this small multi-party call results in the network dedicating resources for only one more person than what was required. Generally, an inefficient dedication of network resources related to one or two, or even more, subscribers is not an issue of paramount concern to the service provider.

However, as discussed above, as the projected participation in multi-party dispatch calls increases in the future, inefficient dedication of network resources to support these larger calls can have significant impact on a service provider. The number of participants in multi-party dispatch calls is expected to increase due to a number of factors, including the ever-increasing popularity of these calls, the availability of broadband access to the network, and the variety of options available for formats for conducting these types of calls, e.g., group calls, public chatrooms, and ad-hoc chatrooms. As can be understood, if a network is required to dedicate resources to support a multi-party call that is projected to have 400 participants, a significant amount of network resources will be dedicated to the call, and thus, unavailable for supporting other subscribers. If all 400 people participate, whereas a large amount of network resources would be required, the network would efficiently utilize all of the dedicated resources in supporting the call. However, in this circumstance of a projected large multi-party call, if only 75% of the projected participants actually participate, a significant amount of dedicated network resources will go unused, even though dedicated. Thus, the network resources that are dedicated to support the remaining 25% of the projected participants that do not actually participate, i.e., 100 people, are not available to support other subscribers. Therefore, in this circumstance where network resources are dedicated to support a large multi-party call and where not all of the projected participants actually participate, a significant amount of network resources are inefficiently dedicated. As discussed above, as multi-party dispatch calls become more and more popular in the future, there is a need to provide a more efficient way of allocating network resources to support these calls.

One alternative, of course, is to merely increase the amount of network resources available in the service provider network. However, this alternative is not desirable for at least the reason that it may be a prohibitively expensive solution for the service provider. Additionally, simply increasing the amount of network resources available does not improve the efficiency with which these resources are utilized.

Therefore, it would be desirable to provide an improved system and method for efficiently utilizing service provider network resources for supporting multi-party dispatch calls.

SUMMARY OF THE INVENTION

In an embodiment of a method of the present invention for allocating service provider network resources for supporting dispatch multi-party calls, the method includes receiving a requirement at the service provider network for supporting a dispatch multi-party call having a projected number of participants. An amount of network resources required to support the projected number of participants is determined. A portion of the amount of network resources required to support the projected number of participants in the dispatch multi-party call is dedicated to the dispatch multi-party call in the service provider network.

In an embodiment of a system of the present invention, the system includes a media server having resources for supporting a dispatch multi-party call having a projected number of participants in a service provider network. A resource manager is coupled to the media server and determines an amount of media server resources required to support the projected number of participants and dedicates a portion of the amount of media resources required to support the projected number of participants in the media server.

DETAILED DESCRIPTION OF THE EXEMPLARY EMBODIMENTS

Figure 1:
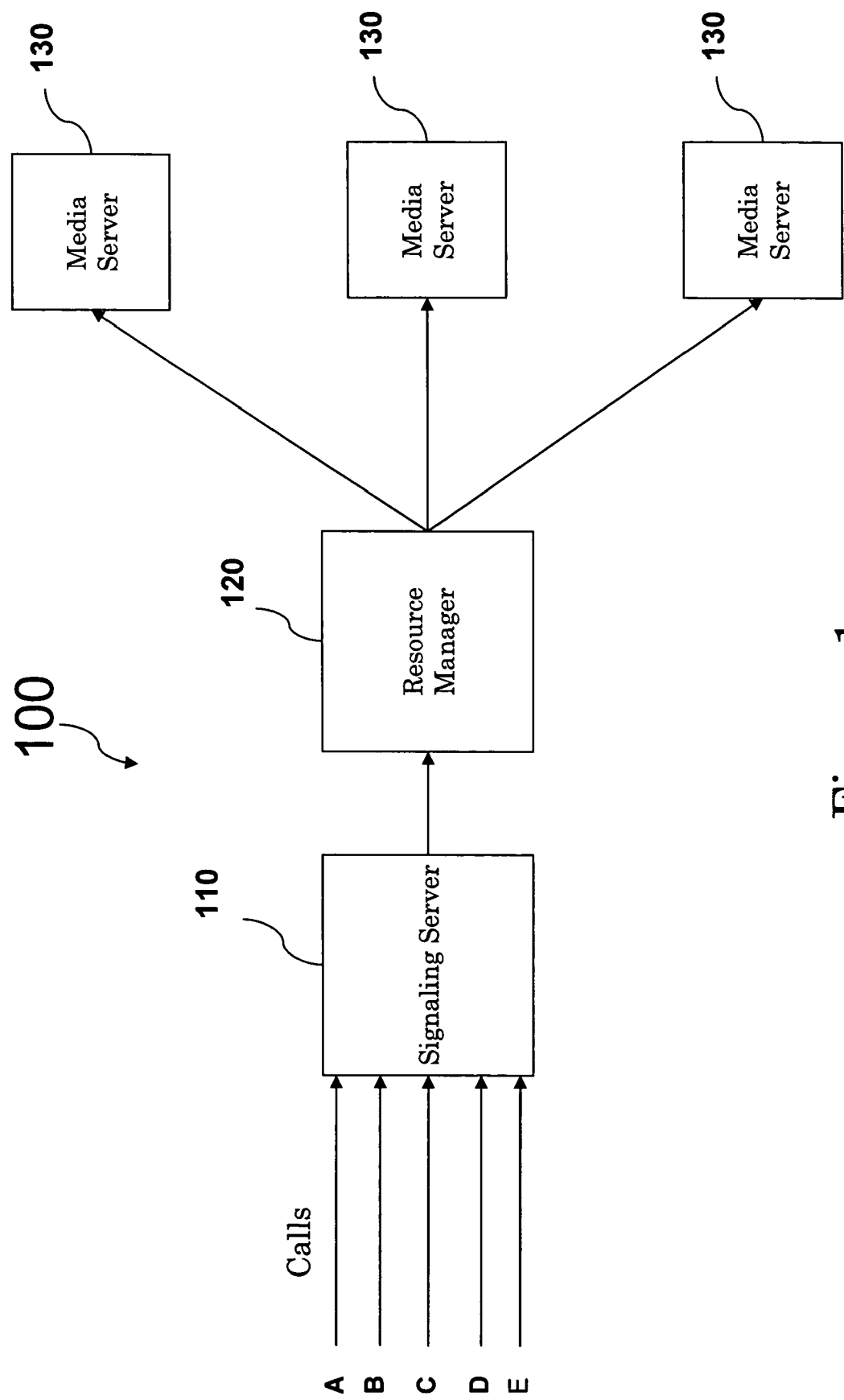
FIG. 1 illustrates an embodiment of a system for allocating network resources for supporting multi-party dispatch calls in accordance with the principles of the present invention.

FIG. 1 illustrates an exemplary system for efficiently allocating network resources for supporting multi-party dispatch calls in accordance with the principles of the present invention. A dispatch call, sometimes referred to as a "walkie-talkie" communication, provides for half-duplex communications between parties where only one party at a time may speak, such as in Nextel Communication Inc.'s push-to-talk (PTT) technology. As will also be further discussed below, dispatch calls may be conducted between more than two parties, i.e., between multiple parties. These multi-party dispatch calls can be conducted as either group calls, chatrooms, or in any other format that provides for participation in the call by more than two parties. The present invention can be utilized to efficiently allocate dispatch network resources for any of a variety of types of dispatch multi-party calls and is not limited to any particular type of format for a dispatch multi-party call.

As illustrated in FIG. 1 in an exemplary embodiment of a dispatch network, calls A-E are received in the dispatch network 100 by a signaling server 110. The signaling server 110 forwards the calls to a resource manager 120, which assigns the calls to a media server 130 with available resources. As the name implies, the media server 130 serves the media for the various calls. However, the media server has limited resources, such as processing power and memory. Accordingly, the media server can only handle a limited number of calls. In accordance with the principles of the present invention, the limited capacity of the media server is efficiently utilized to support multi-party dispatch calls.

As discussed previously, a dispatch call, whether a group call, chatroom, or other type of call, can have a large number of potential participants. For example, a dispatch chatroom call may have 300 potential participants. One method for reserving resources of a media server(s) to ensure the multi-party call can be supported by the dispatch network is to reserve the maximum amount of media server resources necessary to support the call. Accordingly, using this technique, a dispatch chatroom call would reserve resources for 300 participants when the call is setup. However, as was also discussed previously, most-likely not all of the potential participants will actually participate in the call. Thus, this technique results in an unnecessary reservation of network resources and, thus, an inefficient use of these resources. When the network is highly loaded, this inefficient use of network resources could result in an inability of the network to support other required calls.

In accordance with the principles of the present invention and exemplary embodiments thereof, the resource manager initially allocates only a portion of the network resources required, e.g., those in a media server(s), to support a projected number of participants in a multi-party call. In this manner, because in the large majority of dispatch multi-party calls that are conducted not all projected participants actually participate in the call, the initial reservation of network resources is not based solely on the projected number of participants, but rather, is based on this projected number in combination with a consideration of an additional factor or factors. Thus, in most circumstances, the initial allocation of network resources to support a multi-party dispatch call is only a portion of the network resources that would be required to support the call if all of the projected participants actually participate. After this initial allocation of network resources, and after commencement of the call, the resource manager evaluates whether the initial allocation is sufficient/efficient and adjusts the allocation accordingly.

Figure 2:
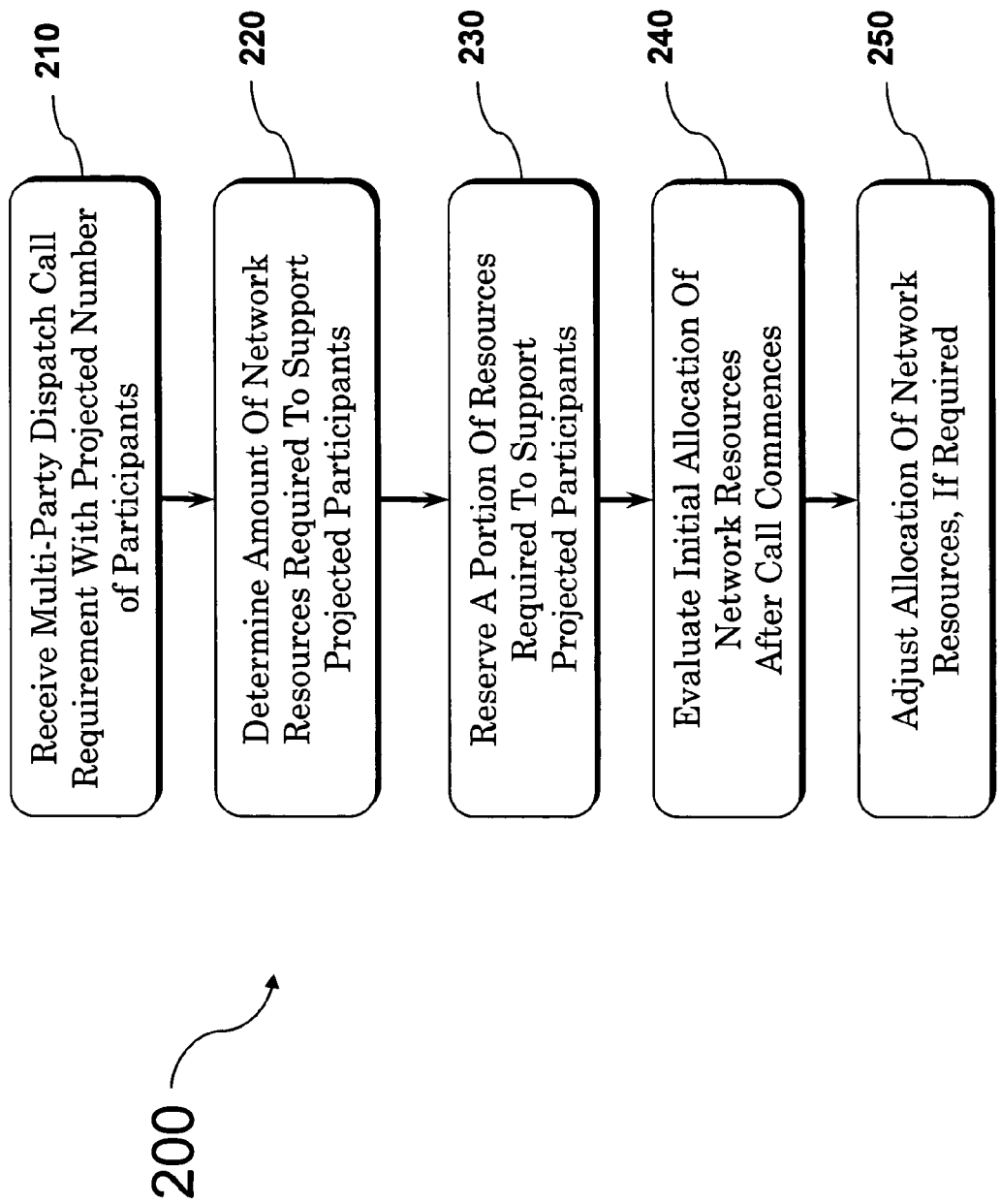
FIG. 2 illustrates an embodiment of a method of the present invention.

FIG. 2 illustrates an embodiment of a method 200 of allocating service provider network resources for supporting dispatch multi-party calls in accordance with the principles of the present invention. As can be seen, in step 210, a requirement is received at the service provider network for supporting a dispatch multi-party call having a projected number of participants. In step 220, the resource manager determines an amount of network resources required to support the projected number of participants and in step 230 the resource manager dedicates a portion of the amount of network resources required to support the projected number of participants in the service provider network.

In determining an amount of network resources to initially reserve for the dispatch multi-party call, the resource manager considers a factor(s) associated with the call and/or the dispatch network in addition to the projected number of participants in the call. For example, this factor could be based on an expected number of participants, which is less than the projected number. This factor may generally be referred to as a participant factor. The participant factor is a percentage that is applied to the projected number of participants to result in a number of expected participants. As such, the number of projected participants is multiplied by the participant factor to determine the number of expected participants. The resource manager then initially allocates an amount of network resources in the dispatch network to fully support this expected number of participants in the multi-party call. As can be understood, the amount of network resources reserved to support the expected number of participants is a portion of the amount that would have been reserved had the reservation been based on the full number of projected participants.

The participant factor that is applied can vary depending on the particular type of multi-party call that is to be conducted, e.g., group call, public chatroom, ad-hoc chatroom, etc. For example, the participant factor can be 60 percent for group calls, 40 percent for ad-hoc chatrooms, and 20 percent for public chatrooms. Accordingly, if a public chatroom is reserved for 1000 participants, the actual amount of resources initially reserved would be for 200 participants, i.e., 0.20*1000. Alternatively, a common participant factor can be applied to the various types of multi-party calls.

The participant factor(s) can be determined based on historical data. As is illustrated in the above example, it may be likely that the participant factor is greater for a group call than a chatroom. As will be further discussed below, in a group call, if a group member is available for the call, the group member will be included in the call. This is in contrast to a chatroom where a party is a participant only if the party desires to participate. Therefore, it may be likely that a greater percentage of the projected participants will actually participate in a group call than in a chatroom since a group call member has less flexibility in determining whether or not the member will participate in the group call. The present invention is not limited to any particular participant factor nor any particular method for determining a participant factor. All that is required in an embodiment is that a participant factor be considered by the resource manager when determining an initial amount of network resources to dedicate to any particular multi-party dispatch call.

The factor that is considered by the resource manager in determining the amount of network resources to initially dedicate to the multi-party dispatch call is not limited to being based on an expected number of participants. As mentioned above, a different factor(s) may be considered as well. This other factor(s) may be considered in conjunction with the participant factor or in lieu of the participant factor. One of these other factors that may be considered is based on the projected or actual loading of the dispatch network at the expected time of the multi-party call. This factor may generally be referred to as a network load factor.

As in the above example for the participant factor, the network load factor is expressed as a percentage that is applied to the network resources that would be required to support the projected number of participants to result in a reduced amount of network resources. For example, for a call with a projected number of 100 participants, it can be determined that X amount of network resources would be required. However, as discussed above, it is very unlikely that all of the projected participants will participate. Therefore, it is not required to initially reserve X amount of network resources to support this call. As discussed above, the initial reservation can be reduced by a factor due to this expected non-participation. However, in this example, the reduction is not based on the expected level of participation, but rather, on the loading of the network.

In this methodology, if the network is expected to be lightly loaded at the time of the call, the initial resources may be allocated at 95% of the projected required resources for the full projected number of participants. Even though this may result in some network inefficiency since most-likely less than 95% of the projected participants will actually participate, if the network is lightly loaded, this may not be a problem for the network. However, if the network is expected to be heavily loaded, then more network resources may be required for other calls and, thus, the initial resources may be allocated at 60% of the projected required resources. For this circumstance, based on a factor dependent on network load, the initial allocation will be reduced to a greater extent than if the network was lightly loaded.

Thus, the network load factor is based on utilization of the network and is expressed as a percentage that is applied to the amount of initial network resources that would be reserved to fully support the projected number of participants in a multi-party call. The percentage is used to, generally, reduce the initial allocation of resources by the resource manager. Thus, the percentage is not required to directly correlate to the percentage utilization of the network, but rather, is derived based on the network percentage utilization. The present invention is not limited to any particular methodology for determining the network load factor.

The participant factor and the network load factor are not required to be independently applied. It may be desirable to determine an initial allocation of network resources for support of a multi-party call by considering both the participant factor and the network load factor. The two are not mutually exclusive. Additionally, as discussed above, the present invention is not limited to any particular methodology for determining the participant factor and the network load factor. For example, an algorithm(s) can be developed to determine these factors based on any of a variety of considerations, e.g., confidence factor, margin, etc. All that is required is that a factor be determined for application to an amount of resources required to support a projected number of participants to determine an initial allocation of resources.

Continuing further with an embodiment of a method of the present invention, as can also be seen in FIG. 2, in step 240 the resource manager evaluates whether the initial allocation of network resources is sufficient to support the multi-party call and/or is an efficient allocation of network resources. The resource manager can perform this evaluation in any number of ways and the present invention is not limited to any particular methodology. For example, the resource manager can determine the number of active participants in the multi-party call at any particular point in time on a real-time basis and determine if the allocated network resources are sufficient to adequately support this number of participants.

Additionally or alternatively, the resource manager can evaluate the network load at any particular point in time. The resource manager can determine, for example, if the predicted network load was accurate and/or if the actual network load justifies modification of the initial allocation of resources, either increasing or decreasing the allocation. For example, if the actual network load is greater than what was predicted, the resource manager may need to decrease the allocation to the multi-party call and, as can be understood, if the actual load is less than predicted then the allocation may be able to be increased.

As was discussed above with respect to the participant factor and the network load factor, the present invention is not limited to evaluating the sufficiency/efficiency of the initial allocation based on any one criterion or any combination of criteria. Various criteria can be contemplated by those skilled in the art for evaluating the sufficiency/efficiency of an initial allocation of network resources in accordance with the principles of the present invention.

As illustrated in step 250, the evaluation process by the resource manager can result in an adjustment of the initial allocation of network resources, e.g., by dynamically adjusting the allocation factors of the participant factor and/or the network load factor, based on real-time network data, if required. If additional resources are required or available after the initial allocation, the network can allocate the additional resources as needed. Alternatively, if the initial allocation was too great, the allocation can be reduced.

As discussed above, the present invention can be utilized to efficiently allocate dispatch network resources for any of a variety of types of dispatch multi-party calls. One type of these multi-party calls is a group call. As is known, dispatch group calls are generally conducted between group members for groups that are pre-defined prior to the calls. For example, if a business person regularly needs to communicate with certain other people in the business, the person can define a group to include these other people and upon initiation of a group call to these persons, all are automatically connected into the group call if they are available, e.g., their phone is turned on and they are not utilizing the phone to communicate with someone else.

Another type of group call that can be efficiently allocated in the service provider network by using the principles of the present invention is a selective dynamic group call. In this type of group call, the group members are selected by the initiator of the group call in conjunction with establishing the group call. This methodology may be referred to as a selective dynamic group call since the group members are selectively defined by the call initiator and also are dynamically defined, i.e., not pre-defined.

As discussed above, the present invention may also be practiced in the context of dispatch chatrooms. A dispatch chatroom is also a multi-party dispatch call, however, chatrooms differ from group calls in the manner in which participants initiate their participation in the calls. Generally, in a group call, if a subscriber is defined as a member of a group and the subscriber is available when the group call is initiated the subscriber is automatically a participant in the group call. In a chatroom, generally, the subscriber only participates in the multi-party call if the subscriber desires to participate, i.e., he/she is not automatically a participant as in the group call. In a chatroom, the subscriber is able to accept or decline an invitation to join the chatroom and/or enter a chatroom without having to be invited. Each of several different types of chatrooms are briefly described below.

One type of chatroom may be referred to as an ad-hoc chatroom. As discussed above, the potential participants in the ad-hoc chatroom dispatch call are not included in a pre-defined group. The chatroom initiator has the flexibility to identify and invite potential participants contemporaneously with the requirement for establishing the chatroom. Thus, in contrast to the method of how certain group calls are currently established by using a pre-defined group, the present invention includes the flexibility of forming a chatroom on an ad-hoc basis.

In establishing an ad-hoc chatroom, invitations are sent to a group of called parties, as selected by the initiator of the chatroom, for participation in the chatroom. Each called party may decide whether to opt-in to the chatroom. That is, as discussed above, the called party is not a participant in the chatroom unless the called party accepts the invitation to join the chatroom. If the called party either declines the invitation or defers acting on the invitation, the called party is not a participant in the chatroom, i.e., does not hear audio communications from, nor provide communications to, other participants in the chatroom. Therefore, a called party is a participant in an ad-hoc chatroom only if the called party decides to accept the invitation to join the call. This is in contrast to current methods for establishing dispatch group calls where if a group member is available the member is automatically a participant in the group call and must opt-out of the call after being a participant in the call. Thus, in an ad-hoc chatroom, invitations are sent to called parties to participate in a multi-party call and the called party is a participant in the call only if the called party accepts the invitation.

Another type of chatroom with which the present invention may be practiced is a public dispatch chatroom. In a public chatroom, the potential participants are also not required to be included in a defined group. Public chatrooms can be pre-defined through a telecommunications service provider network and participation in the chatroom is open to any subscriber, i.e., the chatroom is public. Thus, a subscriber that desires to participate in a public chatroom does not need to be defined as a member of a group for the dispatch multi-party session, nor does the subscriber need to be invited to join the session. The chatroom is identified to subscribers of the network to make them aware of the existence of the chatroom and, if the subscriber desires to participate in the public chatroom, the subscriber can join the chatroom.

The present invention may also be practiced with a private chatroom. A private chatroom has a limited, known list of potential participants and only people included in a chatroom definition list are allowed to enter the chatroom.

Of course, the present invention is not limited to being practiced with any particular format for a multi-party dispatch call. The principles of the present invention for efficiently allocating network resources in a dispatch service provider network for a dispatch multi-party call can be practiced with any of a variety of formats for the multi-party call.

The disclosed embodiments are illustrative of the various ways in which the present invention may be practiced. Other embodiments can be implemented by those skilled in the art without departing from the spirit and scope of the present invention.

What is claimed is:

1. A method of allocating service provider network resources for supporting dispatch multi-party calls, comprising the acts of:
   receiving a requirement at the service provider network for supporting a dispatch multi-party call having a projected number of participants;
   determining an amount of network resources required to support the projected number of participants; and
   dedicating a portion of the amount of network resources required to support the projected number of participants in the dispatch multi-party call to the dispatch multi-party call in the service provider network, such that a total initial allocation of network resources to support the dispatch multi-party call is only a portion of the amount of network resources required to support all of the projected number of participants.

2. The method of claim 1 wherein the act of dedicating a portion of the amount of network resources includes the act of determining a reduced amount of network resources required to support a reduced number of projected participants in the dispatch multi-party call.

3. The method of claim 2 wherein the act of determining a reduced amount of network resources includes the act of applying a network load factor to the amount of network resources required to support the projected number of participants.

4. The method of claim 2 wherein the reduced number of projected participants is determined by applying a participant factor to the projected number of participants.

5. The method of claim 1 further comprising the act of evaluating whether the dedicated portion of the amount of network resources is sufficient to support the dispatch multi-party call after commencement of the call.

6. The method of claim 5 wherein the act of evaluating includes the act of determining an actual number of participants in the dispatch multi-party call.

7. The method of claim 6 further comprising the act of adjusting the dedicated portion of the amount of network resources based on the actual number of participants in the dispatch multi-party call.

8. The method of claim 7 wherein the act of adjusting the dedicated portion of the amount of network resources includes the act of increasing the dedicated portion.

9. The method of claim 7 wherein the act of adjusting the dedicated portion of the amount of network resources includes the act of decreasing the dedicated portion.

10. The method of claim 1 further comprising the act of evaluating whether the dedicated portion of the amount of network resources is an efficient allocation of network resources for supporting the dispatch multi-party call after commencement of the call.

11. The method of claim 10 wherein the act of evaluating includes the act of determining an actual load on the service provider network.

12. The method of claim 11 further comprising the act of adjusting the dedicated portion of the amount of network resources based on the act of evaluating.

13. The method of claim 12 wherein the act of adjusting the dedicated portion of the amount of network resources includes the act of increasing the dedicated portion.

14. The method of claim 12 wherein the act of adjusting the dedicated portion of the amount of network resources includes the act of decreasing the dedicated portion.

15. The method of claim 1 wherein the dispatch multi-party call is a group call.

16. The method of claim 1 wherein the dispatch multi-party call is a public dispatch chatroom.

17. The method of claim 1 wherein the dispatch multi-party call is a private dispatch chatroom.

18. The method of claim 1 wherein the dispatch multi-party call is an ad-hoc dispatch chatroom.

19. A system for allocating service provider network resources for supporting dispatch multi-party calls, comprising:
a media server having resources for supporting a dispatch multi-party call in a service provider network having a projected number of participants; and
a resource manager coupled to the media server;
wherein the resource manager determines an amount of media server resources required to support the projected number of participants and dedicates a portion of the amount of media resources required to support the projected number of participants in the dispatch multi-party call in the media server, such that a total initial allocation of media server resources to support the dispatch multi-party call is only a portion of the amount of media server resources required to support all of the projected number of participants.

20. The system of claim 19 wherein the resources include a processor and a memory.

21. The system of claim 19 wherein the resource manager dedicates the portion of the amount of network resources by determining a reduced amount of network resources required to support a reduced number of projected participants in the dispatch multi-party call.

22. The system of claim 21 wherein the resource manager determines the reduced amount of network resources by applying a network load factor to the amount of network resources required to support the projected number of participants.

23. The system of claim 21 wherein the resource manager determines the reduced number of projected participants by applying a participant factor to the projected number of participants.

24. The system of claim 19 further wherein the resource manager evaluates whether the dedicated portion of the amount of network resources is sufficient to support the dispatch multi-party call after commencement of the call.

25. The system of claim 24 wherein the resource manager evaluates whether the dedicated portion of the amount of network resources is sufficient to support the dispatch multi-party call by determining an actual number of participants in the dispatch multi-party call.

26. The system of claim 25 wherein the resource manager adjusts the dedicated portion of the amount of network resources based on the actual number of participants in the dispatch multi-party call.

27. The system of claim 26 wherein the resource manager adjusts the dedicated portion of the amount of network resources by increasing the dedicated portion.

28. The system of claim 26 wherein the resource manager adjusts the dedicated portion of the amount of network resources by decreasing the dedicated portion.

29. The system of claim 19 wherein the resource manager evaluates whether the dedicated portion of the amount of network resources is an efficient allocation of network resources for supporting the dispatch multi-party call after commencement of the call.

30. The system of claim 29 wherein the resource manager evaluates whether the dedicated portion of the amount of network resources is an efficient allocation of network resources by determining an actual load on the service provider network.

31. The system of claim 30 wherein the resource manager adjusts the dedicated portion of the amount of network resources based on the actual load on the service provider network.

32. The system of claim 31 wherein the resource manger adjusts the dedicated portion of the amount of network resources by increasing the dedicated portion.

33. The system of claim 31 wherein the resource manager adjusts the dedicated portion of the amount of network resources by decreasing the dedicated portion.

34. The system of claim 19 wherein the dispatch multi-party call is a group call.

35. The system of claim 19 wherein the dispatch multi-party call is a public dispatch chatroom.

36. The system of claim 19 wherein the dispatch multi-party call is a private dispatch chatroom.

37. The system of claim 19 wherein the dispatch multi-party call is an ad-hoc dispatch chatroom.

* * * * *